United States Patent
Groer

(10) Patent No.: US 7,480,559 B2
(45) Date of Patent: Jan. 20, 2009

(54) CALIBRATABLE FAULT REACTIONS IN HEAVY-DUTY DIESEL ENGINES

(75) Inventor: Frank S. Groer, West Bloomfield (DE)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 11/940,073

(22) Filed: Nov. 14, 2007

(65) Prior Publication Data
US 2008/0162022 A1      Jul. 3, 2008

Related U.S. Application Data

(60) Provisional application No. 60/877,446, filed on Dec. 28, 2006.

(51) Int. Cl.
G06F 19/00  (2006.01)
F01N 3/00   (2006.01)

(52) U.S. Cl. .................. 701/114; 60/285; 60/277

(58) Field of Classification Search ............ 701/103, 701/104, 114, 115, 112; 60/285, 286, 274, 60/276, 277
See application file for complete search history.

(56) References Cited

U.S. PATENT DOCUMENTS

| | | | |
|---|---|---|---|
| 3,996,905 A | 12/1976 | Dawson | |
| 5,070,832 A | 12/1991 | Hapka et al. | |
| 5,445,128 A * | 8/1995 | Letang et al. | 123/436 |
| 5,447,031 A | 9/1995 | Betts et al. | |
| 5,462,032 A | 10/1995 | Nakamura et al. | |
| 5,847,644 A * | 12/1998 | Weisman, II et al. | 340/439 |
| 5,941,918 A | 8/1999 | Blosser | |
| 6,067,489 A * | 5/2000 | Letang et al. | 701/36 |
| 6,145,494 A * | 11/2000 | Klopp | 123/525 |
| 6,473,677 B1 | 10/2002 | Hershey et al. | |
| 7,000,590 B2 | 2/2006 | Carlton et al. | |
| 7,010,417 B2 | 3/2006 | Edwards, II et al. | |
| 7,168,240 B2 | 1/2007 | Tani et al. | |
| 2006/0260305 A1 * | 11/2006 | Ishiwatari | 60/599 |

* cited by examiner

*Primary Examiner*—John T Kwon
(74) *Attorney, Agent, or Firm*—Bill C. Panagos; Rader, Fishman & Grauer PLLC

(57) ABSTRACT

A method to operate an internal combustion engine by derating the engine in response to sensed emissions levels as compared to engine speed and engine torque and logging a fault.

9 Claims, 3 Drawing Sheets

CALIBRATABLE FAULT REACTIONS IN HEAVY-DUTY DIESEL ENGINES

CROSS-REFERENCE TO RELATED APPLICATIONS

The present application claims priority to U.S. Provisional Application Ser. No. 60/877,446 filed on Dec. 28, 2006, the contents of which are incorporated herein in their entirety.

BACKGROUND OF THE INVENTION

1. Field of the Invention

The present invention is related to a method to operate an internal combustion engine having electronic control to detect emissions, compare the emissions to stored emissions at given engine speeds and torques, and derate the engine if the actual emissions are outside the range of calculated emissions for a given engine speed or torque.

The present invention further relates to a method to operate an electronic controlled internal combustion engine to detect failures or impending failures in an emission system and derate at least one of engine speed and engine torque by an amount sufficient to reduce emissions levels to calibrated emissions levels and render an indication to an operator of the failure or impending failure. Once the engine is serviced, the sensed failure repaired, or at the next ignition cycle, whichever is first, the engine can be re-calibrated or reset to operate without derate of at least one of engine speed and engine torque.

2. Description of the Related Art

Tani et al., U.S. Pat. No. 7,168,240 discloses a control apparatus for an internal combustion engine that can detect degradation of a three-way catalyst with high accuracy and without causing deterioration in an exhaust. A pair of first and second air fuel ratio detectors are disposed in an exhaust system at locations upstream and downstream of a three-way catalyst for detecting a first and second air fuel ratio of an exhaust gas. A target oxygen change amount calculator calculates a target oxygen change amount in a three-way catalyst, and an oxygen change amount calculator calculates an oxygen change mount of the three-way catalyst from an amount of exhaust gas passing through the three-way catalyst in the first air fuel ratio. An air fuel ratio operator inversely controls the air fuel ratio to a rich side and the lean side with a prescribed air fuel ratio width each time the oxygen change amount reaches a target oxygen change amount.

Edwards, II et al., U.S. Pat. No. 7,010,417 discloses a system for determining the maximum available engine output torque that includes an engine speed sensor and a control computer to produce a fueling command for fueling an internal combustion engine. The computer is configured to produce a maximum available engine output torque as a function of the engine speed signal and the fueling command. In another embodiment, the system includes a control computer configured to produce the maximum available engine output torque value as a function of engine speed, at least one engine intake parameter associating an intake manifold coupled to an engine and an exhaust parameter associated with the exhaust gas structure coupled to the engine. And on engine exhaust parameter associated with an exhaust gas structure coupled to the engine. In either case, the engine control strategy is responsive to the maximum available engine torque value to control an engine driven accessory. One of the engine parameters that are examined for determining maximum fueling and/or maximum torque is exhaust parameters such as contents of the exhaust gas.

Hershey, U.S. Pat. No. 6,473,677 discloses a system for determining a maintenance schedule for a jet engine using at least remotely gathered environmental data. The system includes a remote monitor having a sensor for collecting the remotely gathered environmental data. A data pathway is connected to a remote monitor and a processor is connected to the data pathway and processes the remotely gathered environmental data collected by the remote monitor. An environmental database is connected to the data pathway and compiles and stores remotely gathered environmental data. A flight database is connected to the data pathway and compiles and stores flight data for the jet engine. The flight data includes at least thermal cycle data and time on wing data. The processors adapt to generate the maintenance schedule for the jet engine based on the remotely gathered environmental data and flight data.

Blosser, U.S. Pat. No. 5,941,918 discloses a vehicle on board diagnostic system in which the system determines whether the vehicle is continuously in compliance with regulatory emissions standards by sensing only hydrocarbon and carbon monoxide emissions at a position downstream from the three-way catalytic converter. All emission data sensed is correlated to basic vehicle function such as speed and sorted into a number of histograms corresponding to vehicle operating conditions specified by emissions regulations. The histograms are sampled in a statistically validated manner to determine if the vehicle complies with emissions standards. If a failure has occurred, further histogram diagnostic routines are sequentially implement to determine which emission of the vehicle has failed. An indicator is activated to alert the vehicle operator that an emissions failure has occurred.

Betts, et al., U.S. Pat. No. 5,447,031 discloses a dynamic waste gate failure detection apparatus for determining waste gate failure levels for individual internal combustion engines. The apparatus measures and stores intake boost pressures at times when the engine is producing higher boost pressure levels. The apparatus calculates a boost pressure limit value as a function of the stored boost pressures. A waste gate failure is indicated and the engine output power is derated when a boost pressure value exceeds the sum of the boost pressure limit value and a predetermined pressure differential. The ECM derates the engine to 80% of its normal operating abilities in order to prevent pressure from exceeding a level at which engine damage may occur.

Hapka, et al., U.S. Pat. No. 5,070,832 discloses an engine protection system wherein engine performance is derated as a function of the severity of a fluid parameter fault. In one schedule, engine power torque as a function of engine speed is gradually reduced or derated as the fluid parameter moves further out of normal operating range. With this derate schedule the engine will still run and the driver can still operate the vehicle, albeit at lower power levels than a healthy engine. In a second schedule for a severe fault condition, the maximum allowable engine speed is gradually reduced over a certain time period to a certain percentage of the normal maximum engine rpm. Both schedules permit continued operation of the engine in a "limp home" mode for the less severe faults, and as required after a more severe fault, to bring the vehicle safely to a stop. The engine protection system also stores an array of fault information that can be later accessed to investigate engine fluid parameter faults.

BRIEF SUMMARY OF THE INVENTION

The present invention is a method to operate an internal combustion engine, and particularly a heavy duty diesel engine, having electronic control unit (ECU) having a Motor Control Module (MCM) and a Component Powertrain Controller (CPC), each with non-volatile memory and in electronic communication with each other, the engine is further equipped with an emissions system with sensors in electronic communication with the MCM to transmit data signals indicative of exhaust system emissions and failures or impending failures, the method being to force a maximum available engine torque and speed whenever an emission related fault is detected. The method comprises the steps of:

a) determining whether a detected error is an emission related fault;

b) determining actual engine speed and engine torque and emissions levels and comparing actual them with a calculated emission level stored in memory for said actual engine speed and engine torque;

c) de-rating at least said engine torque a predetermined amount as a fault reaction at actual engine speed sufficient to reduce actual emissions to calculated emissions; and d) setting a fault in memory and said engine control unit.

A more detailed understanding of the invention will become apparent upon reading the specification as set forth below.

DETAILED DESCRIPTION OF THE PREFERRED EMBODIMENT(S)

Figure 1:
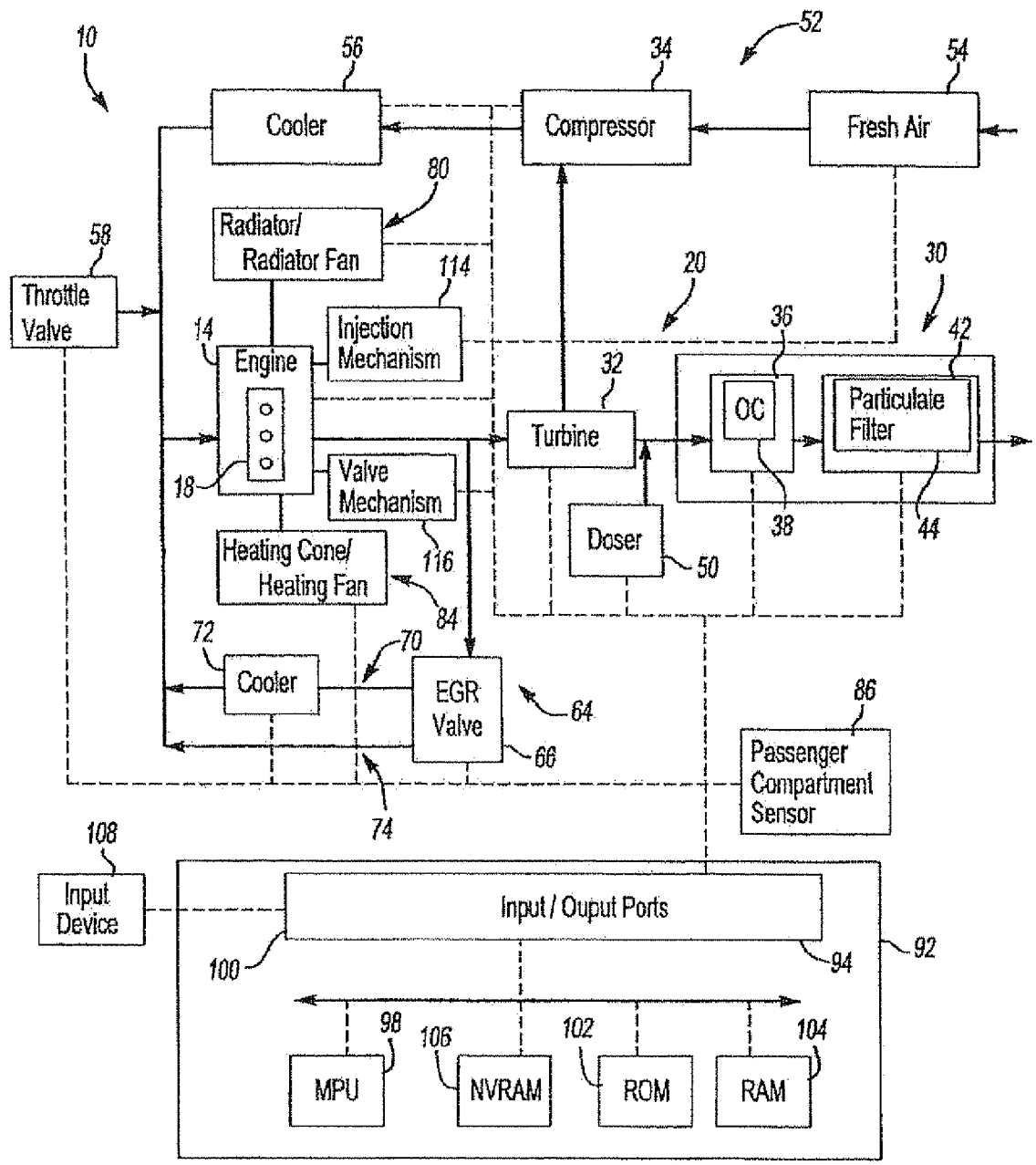
FIG. 1 is a schematic representation of an electronic controlled heavy-duty diesel engine with exhaust system after treatment.

FIG. 1 illustrates a vehicle powertrain system 10 in accordance with one non-limiting aspect of the present invention. The system 10 may provide power for driving any number of vehicles, including on-highway trucks, construction equipment, marine vessels, stationary generators, automobiles, trucks, tractor-trailers, boats, recreational vehicle, light and heavy-duty work vehicles, and the like.

The system 10 may be referred to as an internal combustion driven system wherein fuels, such as gasoline and diesel fuels, are burned in a combustion process to provide power, such as with a spark or compression ignition engine 14. The engine 14 may be a diesel engine that includes a number of cylinders 18 into which fuel and air are injected for ignition as one skilled in the art will appreciate. The engine 14 may be a multi-cylinder compression ignition internal combustion engine, such as a 4, 6, 8, 12, 16, or 24 cylinder diesel engines, for example. It should be noted, however, that the present invention is not limited to a particular type of engine or fuel.

Exhaust gases generated by the engine 14 during combustion may be emitted through an exhaust system 20. The exhaust system 20 may include any number of features, including an exhaust manifold and passageways to deliver the emitted exhaust gases to a particulate filter assembly 30, which in the case of diesel engines is commonly referred to as a diesel particulate filter. Optionally, the system 20 may include a turbocharger proximate the exhaust manifold for compressing fresh air delivery into the engine 14. The turbocharger, for example, may include a turbine 32 and a compressor 34, such as a variable geometry turbocharger (VGT) and/or a turbo compound power turbine. Of course, the present invention is not limited to exhaust systems having turbochargers or the like.

The particulate filter assembly 30 may be configured to capture particulates associated with the combustion process. In more detail, the particulate filter assembly 30 may include an oxidation catalyst (OC) canister 36, which in includes an OC 38, and a particulate filter canister 42, which includes a particulate filter 44. The canisters 36, 42 may be separate components joined together with a clamp or other feature such that the canisters 36, 42 may be separated for servicing and other operations. Of course, the present invention is not intended to be limited to this exemplary configuration for the particulate filter assembly 30. Rather, the present invention contemplates the particulate filter assembly including more or less of these components and features. In particular, the present invention contemplates the particulate filter assembly 30 including only the particulate filter 44 and not necessarily the OC canister 36 or substrate 38 and that the particulate filter 44 may be located in other portions of the exhaust system 20, such as upstream of the turbine 32.

The OC 38, which for diesel engines is commonly referred to as a diesel oxidation catalyst, may oxidize hydrocarbons and carbon monoxide included within the exhaust gases so as to increase temperatures at the particulate filter 44. The particulate filter 44 may capture particulates included within the exhaust gases, such as carbon, oil particles, ash, and the like, and regenerate the captured particulates if temperatures associated therewith are sufficiently high. In accordance with one non-limiting aspect of the present invention, one object of the particulate filter assembly 30 is to capture harmful carbonaceous particles included in the exhaust gases and to store these contaminates until temperatures at the particulate filter 44 favor oxidation of the captured particulates into a gas that can be discharged to the atmosphere.

The OC and particulate filter canisters 36, 42 may include inlets and outlets having defined cross-sectional areas with expansive portions there between to store the OC 38 and particulate filter 44, respectively. However, the present invention contemplates that the canisters 36, 42 and devices therein may include any number configurations and arrangements for oxidizing emissions and capturing particulates. As such, the present invention is not intended to be limited to any particular configuration for the particulate filter assembly 30.

To facilitate oxidizing the capture particulates, a doser 50 may be included to introduce fuel to the exhaust gases such that the fuel reacts with the OC 38 and combusts to increase temperatures at the particulate filter 44, such as to facilitate regeneration. For example, one non-limiting aspect of the present invention contemplates controlling the amount of fuel injected from the doser as a function of temperatures at the particulate filter 44 and other system parameters, such as air mass flow, ECR temperatures, and the like, so as to control regeneration. However, the present invention also contemplates that fuel may be included within the exhaust gases through other measures, such as by controlling the engine 14 to emit fuel with the exhaust gases.

An air intake system 52 may be included for delivering fresh air from a fresh air inlet 54 through an air passage to an intake manifold for introduction to the engine 14. In addition, the system 52 may include an air cooler or charge air cooler 56 to cool the fresh air after it is compressed by the compressor 34. Optionally, a throttle intake valve 58 may be provided to control the flow of fresh air to the engine 14. Optionally, the throttle intake valve 58 may also be provided to control the flow of EGR gases to the engine 14 or control both fresh air and EGR gases 64 to the engine 14. The throttle valve 58 may be a manually or electrically operated valve, such as one which is responsive to a pedal position of a throttle pedal operated by a driver of the vehicle. There are many variations possible for such an air intake system and the present invention is not intended to be limited to any particular arrangement. Rather, the present invention contemplates any number of features and devices for providing fresh air to the intake manifold and cylinders, including more or less of the foregoing features.

An exhaust gas recirculation (EGR) system 64 may be optionally provided to recycle exhaust gas to the engine 14 for mixture with the fresh air. The ECR system 64 may selectively introduce a metered portion of the exhaust gasses into the engine 14. The EGR system 64, for example, may dilute the incoming air charge and lower peak combustion temperatures to reduce the amount of oxides of nitrogen produced during combustion. The amount of exhaust gas to be recirculated may be controlled by controlling an EGR valve 66 and/or in combination with other features, such as the turbocharger. The EGR valve 66 may be a variable flow valve that is electronically controlled. There are many possible configurations for the controllable EGR valve 66 and embodiments of the present invention are not limited to any particular structure for the EGR valve 66.

The EGR system 64 in one non-limiting aspect of the present invention may include an EGR cooler passage 70, which includes an EGR cooler 72, and an EGR cooler bypass 74. The EGR valve 66 may be provided at the exhaust manifold to meter exhaust gas through one or both of the EGR cooler passage 70 and bypass 74. Of course, the present invention contemplates that the EGR system 64 may include more or less of these features and other features for recycling exhaust gas. Accordingly, the present invention is not intended to be limited to any one EGR system and contemplates the use of other such systems, including more or less of these features, such as an EGR system having only one of the EGR cooler passage or bypass.

A cooling system 80 may be included for cycling the engine 14 by cycling coolant there through. The coolant may be sufficient for fluidly conducting away heat generated by the engine 14, such as through a radiator. The radiator may include a number of fins through which the coolant flows to be cooled by air flow through an engine housing and/or generated by a radiator fan directed thereto as one skilled in the art will appreciated. It is contemplated, however, that the present invention may include more or less of these features in the cooling system 80 and the present invention is not intended to be limited to the exemplary cooling system described above.

The cooling system 80 may operate in conjunction with a heating system 84. The heating system 84 may include a heating core, a heating fan, and a heater valve. The heating core may receive heated coolant fluid from the engine 14 through the heater valve so that the heating fan, which may be electrically controllable by occupants in a passenger area or cab of a vehicle, may blow air warmed by the heating core to the passengers. For example, the heating fan may be controllable at various speeds to control an amount of warmed air blown past the heating core whereby the warmed air may then be distributed through a venting system to the occupants. Optionally, sensors and switches 86 may be included in the passenger area to control the heating demands of the occupants. The switches and sensors may include dial or digital switches for requesting heating and sensors for determining whether the requested heating demand was met. The present invention contemplates that more or less of these features may be included in the heating system and is not intended to be limited to the exemplary heating system described above.

A controller 92, such as an electronic control module or engine control module, may be included in the system 10 to control various operations of the engine 14 and other system or subsystems associated therewith, such as the sensors in the exhaust, EGR, and intake systems. Various sensors may be in electrical communication with the controller via input/output ports 94. The controller 92 may include a microprocessor unit (MPU) 98 in communication with various computer readable storage media via a data and control bus 100. The computer readable storage media may include any of a number of known devices which function as read only memory 102, random access memory 104, and non-volatile random access memory 106. A data, diagnostics, and programming input and output device 108 may also be selectively connected to the controller via a plug to exchange various information there between. The device 108 may be used to change values within the computer readable storage media, such as configuration settings, calibration variables, instructions for EGR, intake, and exhaust systems control and others.

The system 10 may include an injection mechanism 114 for controlling fuel and/or air injection for the cylinders 18. The injection mechanism 114 may be controlled by the controller 92 or other controller and comprise any number of features, including features for injecting fuel and/or air into a common-rail cylinder intake and a unit that injects fuel and/or air into each cylinder individually. For example, the injection mechanism 114 may separately and independently control the fuel and/or air injected into each cylinder such that each cylinder may be separately and independently controlled to receive varying amounts of fuel and/or air or no fuel and/or air at all. Of course, the present invention contemplates that the injection mechanism 114 may include more or less of these features and is not intended to be limited to the features described above.

The system 10 may include a valve mechanism 116 for controlling valve timing of the cylinders 18, such as to control air flow into and exhaust flow out of the cylinders 18. The valve mechanism 116 may be controlled by the controller 92 or other controller and comprise any number of features, including features for selectively and independently opening and closing cylinder intake and/or exhaust valves. For example, the valve mechanism 116 may independently control the exhaust valve timing of each cylinder such that the exhaust and/or intake valves may be independently opened and closed at controllable intervals, such as with a compression brake. Of course, the present invention contemplates that the valve mechanism may include more or less of these features and is not intended to be limited to the features described above.

In operation, the controller 92 receives signals from various engine/vehicle sensors and executes control logic embedded in hardware and/or software to control the system 10. The computer readable storage media may, for example, include instructions stored thereon that are executable by the controller 92 to perform methods of controlling all features and sub-systems in the system 10. The program instructions may be executed by the controller in the MPU 98 to control the various systems and subsystems of the engine and/or vehicle through the input/output ports 94. In general, the dashed lines shown in FIG. 1 illustrate the optional sensing and control communication between the controller and the various components in the powertrain system. Furthermore, it is appreciated that any number of sensors and features may be associated with each feature in the system for monitoring and controlling the operation thereof.

In one non-limiting aspect of the present invention, the controller 92 may be the DDEC controller available from Detroit Diesel Corporation, Detroit, Mich. Various other features of this controller are described in detail in a number of U.S. patents assigned to Detroit Diesel Corporation Further, the controller may include any of a number of programming and processing techniques or strategies to control any feature in the system 10. Moreover, the present invention contemplates that the system may include more than one controller, such as separate controllers for controlling system or subsystems, including an exhaust system controller to control exhaust gas temperatures, mass flow rates, and other features associated therewith. In addition, these controllers may include other controllers besides the DDEC controller described above.

Figure 2:
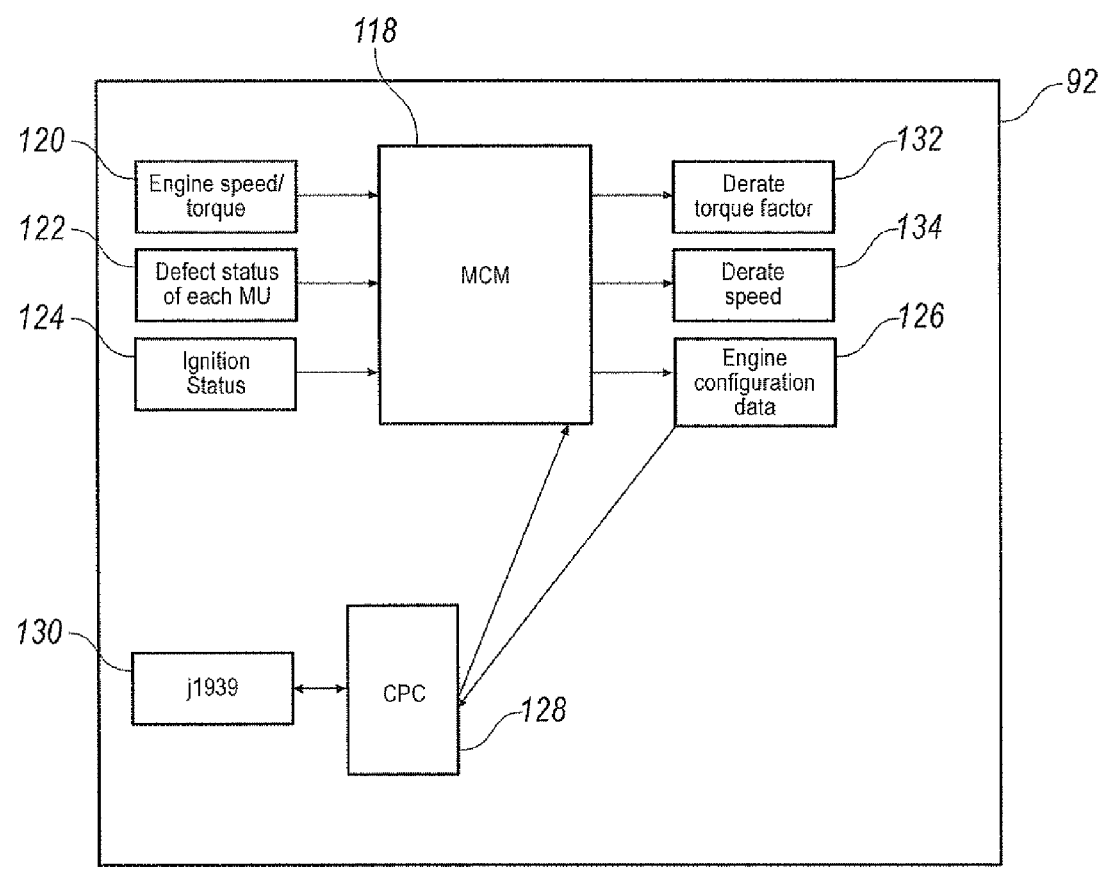
FIG. 2 is a schematic representation of an Electronic Control Unit with a Motor Control Module and a Common Powertrain Controller.

FIG. 2. is a schematic representation of an electronic engine control as set forth in the present invention. Specifically, engine controller 92 has an MCM 118 that is calibratable to operate the engine MCM receives data signal inputs from various sensors and is able to receive data signals indicative of various engine operating parameters such as engine speed elapsed status of each are MU 120 ignition status 122 and engine torque 124. The MCM stores engine configuration data 126 in ROM memory therein indicating the operational status of the engine. The engine configuration data is communicated a CPC2 128 and stored in volatile memory. The CPC2 receives input from an ECAN over SAE J1587 or J1989 data link indicative of the actual engine speed, engine torque and operational status of systems that affect or may affect the exhaust emissions of the engine. The CPC2 unit compares the engine data parameters and permissible emissions levels stored in memory with the actual engine operating parameters and actual exhaust emissions levels. When it is determined the actual exhaust emission levels are out of specification, the information is communicated to the MCM, which logs the fault and determines at least one of a derate factors for engine speed and a derate factor for engine torque that will reduce emission to levels consistent with the derated engine speed and engine torque. The derates are then effected and new engine configuration data are communicated to the CPC and the CPC receives data signals over the ECAN via a J1587 or J1939 data link and applies those inputs to the derated situation and the cycle reports itself. Preferably, the engine speed and torque are derated for an amount sufficient to bring engine operation in compliance with emissions, up to a 10% derate from maximum of engine speed and engine torque. An indicator signal may be included, such as a light on the instrument panel, to alert an operator that a fault has been indicated and the engine is operating in a derated state. A service tool may read the fault, the system failure is repaired or serviced and the CPC is recalibrated and the fault is deleted.

Figure 3:
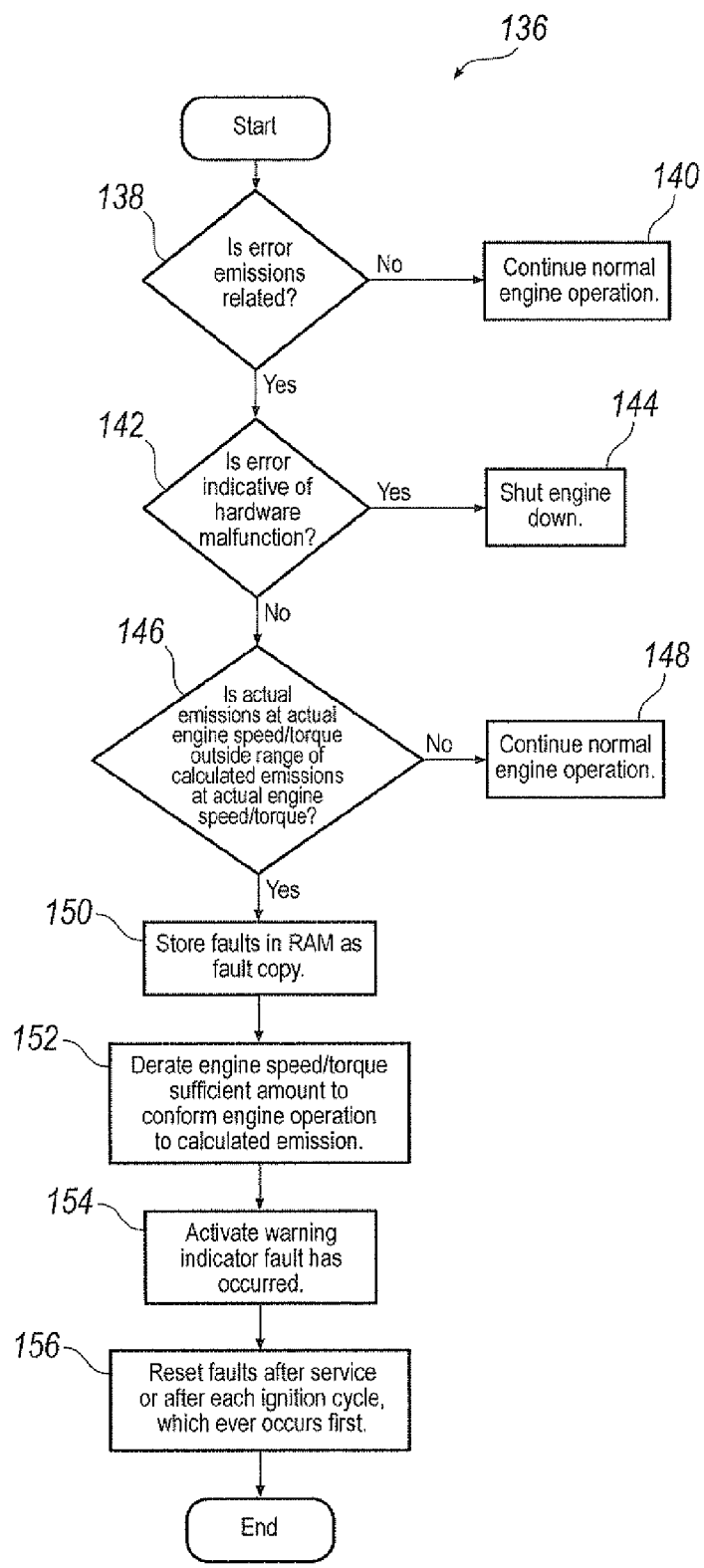
FIG. 3 is a software flow chart showing the steps of the embodiment of the present invention.

FIG. 3 is a software flow chart indicating one method 136 of the present invention. Step 138 is determining whether a monitoring unit (MU) error is emissions related. If no, step 140 is continuing normal engine operation. If yes, step 142 is determining whether the error is indicative of a hardware failure or impending malfunction. If yes, step 144 is shut engine down to prevent further damage to the engine. If the determination in Step 142 is no, step 146 is determine whether the emission levels at actual engine speed and/or engine torque are outside a range of calculated emission levels at actual engine speed or engine torque. If the determination in step 146 is no, step 148 is continue normal engine operation. If the determination in step 146 is yes, step 150 is store fault in RAM as a fault copy. Step 152 is derate the engine speed and/or torque a sufficient amount to conform the engine operation to the calculated emissions. Generally, the derate is up to about a 10% decrease of the maximum torque/speed available. In addition, the derate occurs only in response to the fault copy and is achieved either by reducing the total torque curve available to the engine, or is reduced by a scalar value as a function of engine speed. Preferably, the MCM reports the derate torque available to the CPC through the fault react copy. Step 154 is activate a warning indicator to alert an operator that a fault has occurred. Step 156 is resetting faults after service or after the fault has been repaired or after each ignition cycle, whichever occurs first.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed as new and desired to be protected by Letters Patent of the United States is:

1. A method to operate an electronic controlled internal combustion engine, said engine equipped with an electronic control unit (ECU) comprised of a Motor Control Module (MCM) and a Computer Powertrain Controller (CPC) each of which have volatile and nonvolatile memory; said engine further equipped with an exhaust system including an emissions system and sensors in communication with the MCM to transmit data signals indicative of hardware failures or impending hardware failures and exhaust emissions levels; said method to force a maximum available engine torque and speed whenever an emission related fault is detected; said method comprising:
   a) determining whether a detected error an emission related error;
   b) determining whether actual emission at actual engine speed and engine torque is outside a range of calculated emissions at actual engine speed and engine torque stored in memory;
   c) de-rating at least said engine torque a predetermined amount as a fault reaction at actual engine speed.

2. The method of claim 1, further including derating said engine speed a predetermined amount corresponding to said fault.

3. The method of claim 1, further including resetting said faults at the first to occur of service, repair of fault condition, and initiation of a new ignition cycle.

4. The method of claim 1, wherein said engine torque is reduced according to a scalar torque multiplier as a function of engine speed.

5. The method of claim 1, wherein said engine torque is reduced by reduction of entire engine torque curve.

6. The method of claim 1, further including activating a warning indicator to alert an operator of a fault condition.

7. The method of claim 1, further including storing each said fault reaction in RAM as a fault react copy and using said fault react copy to initiate said derating.

8. The method of claim 1, wherein said MCM reports said derate available torque to said CPC.

9. The method of claim 1, further including initiating engine shut down in the event said fault indicates a hardware malfunction or failure.

\* \* \* \* \*